(12) United States Patent
Kim et al.

(10) Patent No.: US 11,121,765 B2
(45) Date of Patent: Sep. 14, 2021

(54) METHOD AND APPARATUS FOR SIGNAL CONFIGURATION FOR MOBILE BASE STATION

(71) Applicant: ELECTRONICS AND TELECOMMUNICATIONS RESEARCH INSTITUTE, Daejeon (KR)

(72) Inventors: Ji Hyung Kim, Daejeon (KR); Mi Young Yun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/681,736

(22) Filed: Nov. 12, 2019

(65) Prior Publication Data

US 2020/0153500 A1 May 14, 2020

(30) Foreign Application Priority Data

Nov. 13, 2018 (KR) .................. 10-2018-0139416
Nov. 30, 2018 (KR) .................. 10-2018-0151952
(Continued)

(51) Int. Cl.
*H04B 7/185* (2006.01)
*H04W 72/04* (2009.01)
(Continued)

(52) U.S. Cl.
CPC ..... *H04B 7/18541* (2013.01); *H04B 7/18513* (2013.01); *H04B 17/318* (2015.01);
(Continued)

(58) Field of Classification Search
CPC ............ H04B 7/18541; H04B 7/18513; H04B 17/318; H04B 17/382; H04W 76/27;
(Continued)

(56) References Cited

U.S. PATENT DOCUMENTS 7,574,224 B2   8/2009   Lane et al.
7,991,362 B2   8/2011   Lane et al.
(Continued)

FOREIGN PATENT DOCUMENTS

EP      3038275 A1    6/2016
WO    2018164478 A1   9/2018

OTHER PUBLICATIONS

3GPP TS 38.133 V15.3.0 (Sep. 2018), 3rd Generation Partnership Project; Technical Specification Group Radio Access Network; NR; Requirements for support of radio resource management, (Release 15), pp. 1-136.
(Continued)

*Primary Examiner* — Joseph E Dean, Jr.
(74) *Attorney, Agent, or Firm* — Rabin & Berdo, P.C.

(57) ABSTRACT

A handover method for a satellite base station, performed by a terminal, may comprise selecting at least one candidate satellite base station; performing signal strength measurement on a first candidate satellite base station among the at least one candidate satellite base station; in response to determining that the first candidate satellite base station is available according to a result of the signal strength measurement, selecting the first candidate satellite base station as a target satellite base station; and in response to determining that the first candidate satellite base station is not available according to the result of the signal strength measurement, performing signal strength measurement on a second candidate satellite base station among the at least one candidate satellite base station.

14 Claims, 8 Drawing Sheets

(30) Foreign Application Priority Data

Oct. 29, 2019 (KR) ........................ 10-2019-0135370
Oct. 29, 2019 (KR) ........................ 10-2019-0135404

(51) Int. Cl.
| | |
|---|---|
| *H04W 56/00* | (2009.01) |
| *H04W 74/00* | (2009.01) |
| *H04W 76/27* | (2018.01) |
| *H04B 17/318* | (2015.01) |
| *H04W 80/02* | (2009.01) |
| *H04W 36/14* | (2009.01) |
| *H04W 84/06* | (2009.01) |

(52) U.S. Cl.
CPC ....... *H04W 36/14* (2013.01); *H04W 56/0065* (2013.01); *H04W 72/0426* (2013.01); *H04W 74/006* (2013.01); *H04W 76/27* (2018.02); *H04W 80/02* (2013.01); *H04W 84/06* (2013.01)

(58) Field of Classification Search
CPC . H04W 80/02; H04W 72/0426; H04W 36/14; H04W 56/0065; H04W 74/006; H04W 84/06; H04W 56/0045; H04W 36/08
See application file for complete search history.

(56) References Cited

U.S. PATENT DOCUMENTS

| | | | |
|---|---|---|---|
| 8,514,770 B2 | 8/2013 | Kim et al. | |
| 9,749,928 B2* | 8/2017 | Benammar | ........... H04W 36/14 |
| 9,907,043 B2 | 2/2018 | Ratiney et al. | |
| 9,973,264 B2 | 5/2018 | Vasavada et al. | |
| 2005/0281247 A1 | 12/2005 | Lim et al. | |
| 2011/0256865 A1* | 10/2011 | Sayeed | .............. H04B 7/18589 455/427 |
| 2016/0011297 A1 | 1/2016 | Cho | |
| 2016/0278033 A1* | 9/2016 | Wu | .................... H04B 7/18513 |
| 2018/0254859 A1 | 9/2018 | Islam et al. | |
| 2018/0279387 A1 | 9/2018 | Hui et al. | |
| 2018/0324716 A1 | 11/2018 | Jeon et al. | |
| 2018/0324850 A1 | 11/2018 | Amuru et al. | |
| 2018/0324865 A1 | 11/2018 | Hui et al. | |
| 2018/0368189 A1 | 12/2018 | Narasimha et al. | |
| 2019/0230568 A1* | 7/2019 | Arur | .................. H04B 7/18541 |

OTHER PUBLICATIONS

3GPP TS 38.211 V15.3.0 (Sep. 2018), 3rd Generation Partnership Project; Technical Specification Group Radio Access Network; NR; Physical channels and modulation, (Release 15), pp. 1-93.

3GPP TS 38.212 V15.3.0 (Sep. 2018), 3rd Generation Partnership Project; Technical Specification Group Radio Access Network; NR; Multiplexing and channel coding, (Release 15), pp. 1-95.

3GPP TS 38.213 V15.3.0 (Sep. 2018), 3rd Generation Partnership Project; Technical Specification Group Radio Access Network; NR; Physical layer procedures for control, (Release 15), pp. 1-101.

3GPP TS 38/14 V15.3.0 (Sep. 2018), 3rd Generation Partnership Project; Technical Specification Group Radio Access Network; NR; Physical layer procedures for data, (Release 15), pp. 1-96.

3GPP TS 38.321 V15.3.0 (Sep. 2018), 3rd Generation Partnership Project; Technical Specification Group Radio Access Network; NR; Medium Access Control (MAC) protocol specification, (Release 15), pp. 1-76.

3GPP TS 38.331 V15.3.0 (Sep. 2018), 3rd Generation Partnership Project; Technical Specification Group Radio Access Network; NR; Radio Resource Control (RRC) protocol specification, (Release 15), pp. 1-445.

* cited by examiner

FIG. 1

RACH-ConfigCommon information element

```
-- ASN1START
-- TAG-RACH-CONFIG-COMMON-START

RACH-ConfigCommon ::=       SEQUENCE {
    rach-ConfigGeneric          RACH-ConfigGeneric,
    totalNumberOfRA-Preambles   INTEGER (1..63)                                                     OPTIONAL,  -- Need S
    ssb-perRACH-OccasionAndCB-PreamblesPerSSB   CHOICE {
        oneEighth                   ENUMERATED {n4,n8,n12,n16,n20,n24,n28,n32,n36,n40,n44,n48,n52,n56,n60,n64},
        oneFourth                   ENUMERATED {n4,n8,n12,n16,n20,n24,n28,n32,n36,n40,n44,n48,n52,n56,n60,n64},
        oneHalf                     ENUMERATED {n4,n8,n12,n16,n20,n24,n28,n32,n36,n40,n44,n48,n52,n56,n60,n64},
        one                         ENUMERATED {n4,n8,n12,n16,n20,n24,n28,n32,n36,n40,n44,n48,n52,n56,n60,n64},
        two                         ENUMERATED {n4,n8,n12,n16,n20,n24,n28,n32},
        four                        INTEGER (1..16),
        eight                       INTEGER (1..8),
        sixteen                     INTEGER (1..4)
    }                                                                                               OPTIONAL,  -- Need M groupBconfigured            SEQUENCE {
        ra-Msg3SizeGroupA           ENUMERATED {b56, b144, b208, b256, b282, b480, b640,
                                                b800, b1000, b72, spare6, spare5,spare4, spare3, spare2, spare1},
        messagePowerOffsetGroupB    ENUMERATED { minusinfinity, dB0, dB5, dB8, dB10, dB12, dB15, dB18},
        numberOfRA-PreamblesGroupA  INTEGER (1..64)
    }                                                                                               OPTIONAL,  -- Need R
    ra-ContentionResolutionTimer    ENUMERATED { sf8, sf16, sf24, sf32, sf40, sf48, sf56, sf64},
    rsrp-ThresholdSSB               RSRP-Range                                                      OPTIONAL,  -- Need R
    rsrp-ThresholdSSB-SUL           RSRP-Range                                                      OPTIONAL,  -- Cond SUL
    prach-RootSequenceIndex         CHOICE {
        l839                            INTEGER (0..837),
        l139                            INTEGER (0..137)
    },
    msg1-SubcarrierSpacing          SubcarrierSpacing                                               OPTIONAL,  -- Cond L139
    restrictedSetConfig             ENUMERATED {unrestrictedSet, restrictedSetTypeA, restrictedSetTypeB},
    msg3-transformPrecoder          ENUMERATED {enabled}                                            OPTIONAL,  -- Need R
    ...
}
```

FIG. 2

RACH-ConfigGeneric information element

```
-- ASN1START
-- TAG-RACH-CONFIG-GENERIC-START

RACH-ConfigGeneric ::=      SEQUENCE {
    prach-ConfigurationIndex      INTEGER (0..255),
    msg1-FDM                      ENUMERATED {one, two, four, eight},
    msg1-FrequencyStart           INTEGER (0..maxNrofPhysicalResourceBlocks-1),
    zeroCorrelationZoneConfig     INTEGER(0..15),
    preambleReceivedTargetPower   INTEGER (-202..-60),
    preambleTransMax              ENUMERATED {n3, n4, n5, n6, n7, n8, n10, n20, n50, n100, n200},
    powerRampingStep              ENUMERATED {dB0, dB2, dB4, dB6},
    ra-ResponseWindow             ENUMERATED {sl1, sl2, sl4, sl8, sl10, sl20, sl40, sl80},
    ...
}

--      TAG-RACH-CONFIG-GENERIC-STOP
--      ASN1STOP
```

FIG. 3

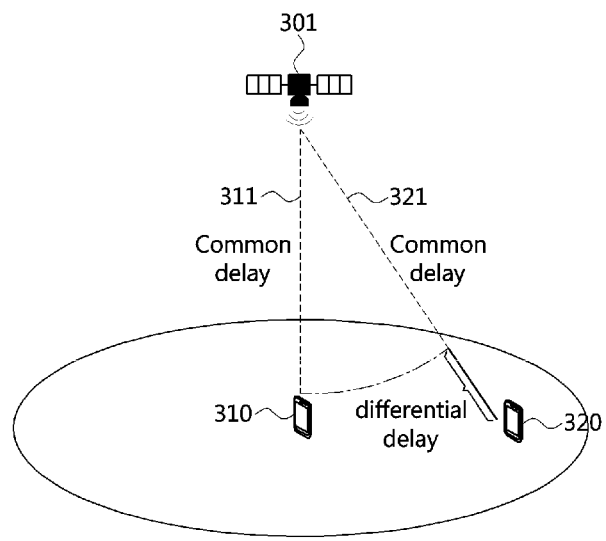

FIG. 4
RACH-ConfigGeneric information element
```
-- ASN1START
-- TAG-RACH-CONFIG-GENERIC-START
RACH-ConfigGeneric ::=        SEQUENCE {
  ...
  rsrp-ThresholdSSB           RSRP-Range    OPTIONAL,
  ThresholdSSB-TA1            RSRP-Range    OPTIONAL,
  ...
  ThresholdSSB-TAN            RSRP-Range    OPTIONAL,
  rsrp-ThresholdSSB-SSUL      RSRP-Range    OPTIONAL,
  ...
}
-- TAG-RACH-CONFIG-GENERIC-STOP
-- ASN1STOP
```
FIG. 5
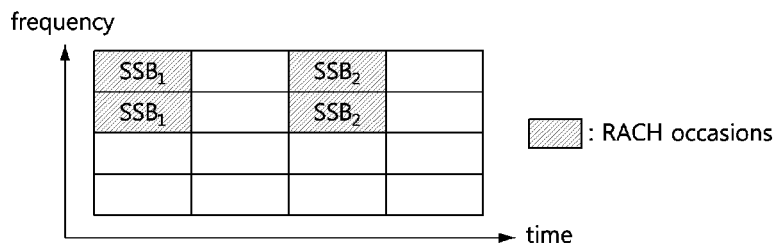
FIG. 6
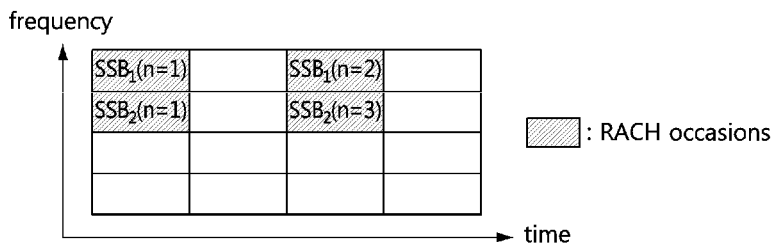

FIG. 7

ServingCellConfigCommonSIB information element

```
-- ASN1START
-- TAG-SERVINGCELLCONFIGCOMMONSIB-START

ServingCellConfigCommonSIB ::=   SEQUENCE {
    downlinkConfigCommon          DownlinkConfigCommonSIB,
    uplinkConfigCommon            UplinkConfigCommonSIB                              OPTIONAL, -- Need R
    supplementaryUplink           UplinkConfigCommonSIB                              OPTIONAL, -- Need R
    n-TimingAdvanceOffset         ENUMERATED { n0, n25600, n39936 }                  OPTIONAL, -- Need S
    ssb-PositionsInBurst          SEQUENCE {
        inOneGroup                    BIT STRING (SIZE (8)),
        groupPresence                 BIT STRING (SIZE (8))                          OPTIONAL -- Cond
    Above6GHzOnly
    },
    ssb-PeriodicityServingCell    ENUMERATED {ms5, ms10, ms20, ms40, ms80, ms160},
    tdd-UL-DL-ConfigurationCommon TDD-UL-DL-ConfigCommon                             OPTIONAL, -- Cond TDD
    ss-PBCH-BlockPower            INTEGER (-60..50),
    ...
}

-- TAG-SERVINGCELLCONFIGCOMMONSIB-STOP
-- ASN1STOP
```

FIG. 8

ServingCellConfigCommon information element

```
-- ASN1START
-- TAG-SERVING-CELL-CONFIG-COMMON-START

ServingCellConfigCommon ::=    SEQUENCE {
    ...
    ssb-PositionsInBurst           CHOICE {
        shortBitmap                    BIT STRING (SIZE (4)),
        mediumBitmap                   BIT STRING (SIZE (8)),
        longBitmap                     BIT STRING (SIZE (64))
    }                              OPTIONAL, -- Cond AbsFreqSSB
    ...
}
```

FIG. 9

TCI-State information element

```
-- ASN1START
-- TAG-TCI-STATE-START

TCI-State ::=            SEQUENCE {
    tci-StateId              TCI-StateId,
    qcl-Type1                QCL-Info,
    qcl-Type2                QCL-Info                                  OPTIONAL,  -- Need R
    ...
}

QCL-Info ::=             SEQUENCE {
    cell                     ServCellIndex                             OPTIONAL,  -- Need R
    bwp-Id                   BWP-Id                                    OPTIONAL,  -- Cond
    CSI-RS-Indicated
    referenceSignal          CHOICE {
        csi-rs                   NZP-CSI-RS-ResourceId,
        ssb                      SSB-Index
    },
    qcl-Type                 ENUMERATED {typeA, typeB, typeC, typeD},
    ...
}
```

METHOD AND APPARATUS FOR SIGNAL CONFIGURATION FOR MOBILE BASE STATION

CROSS-REFERENCE TO RELATED APPLICATIONS

This application claims priority to Korean Patent Applications No. 10-2018-0139416 filed on Nov. 13, 2018, No. 10-2018-0151952 filed on Nov. 30, 2018, No. 10-2019-0135370 filed on Oct. 29, 2019, and No. 10-2019-0135404 filed on Oct. 29, 2019 in the Korean Intellectual Property Office (KIPO), the entire contents of which are hereby incorporated by reference.

BACKGROUND

1. Technical Field

The present disclosure relates to methods and apparatuses for configuring signals for a mobile base station, and more particularly, to methods for timing adjustment and beam management for a mobile base station, and apparatuses for the same.

2. Related Art

There is a need to develop mobile satellite communication technologies to prepare for disruption of communication that may occur in cellular network shadow areas such as mountainous areas, desert areas, islands, and oceans and terrestrial network collapsed areas due to earthquakes, tsunamis, and wars. The satellite communication network is maintained even when the terrestrial network is collapsed due to disasters, so that the area where the disasters occur can be connected to the outside, and individual survival and safety can be maintained.

In addition, the necessity of mobile satellite communication technologies is increasing for construction of a hyper-connected society that provides mobile communication services even in areas where communication has not been possible in the past, such as mountains and remote areas without a communication infrastructure.

In the 3rd generation partnership project (3GPP), based on 5G new radio (NR) technology, standardization of non-terrestrial networks (NTNs) using a non-terrestrial base station (e.g., a base station using an airborne platform such as a satellite base station or an airship) is being progressed. In particular, in the case of the satellite base station, since the distance between a terminal and the base station is far greater than in the case of the existing cellular mobile communication system, a stable initial access method for such long distance communications is required. On the other hand, when the non-terrestrial base station is a satellite base station, the distance between the satellite base station and the terminal may be a long distance, and the position of the satellite base station may be continuously changed. Accordingly, there is a need for a timing adjustment method and a beam management method between a mobile base station and a terminal, which enables the connection between the mobile base station and the terminal to be maintained.

SUMMARY

Accordingly, exemplary embodiments of the present disclosure provide a method for performing stable initial access for long distance communications. Accordingly, exemplary embodiments of the present disclosure also provide an apparatus for performing stable initial access for long distance communications. Accordingly, exemplary embodiments of the present disclosure also provide a timing adjustment method and a beam management method for a mobile base station. Accordingly, exemplary embodiments of the present disclosure also provide a timing adjustment apparatus and a beam management apparatus for a mobile base station.

According to exemplary embodiments of the present disclosure, a handover method for a satellite base station, performed by a terminal, may comprise selecting at least one candidate satellite base station; performing signal strength measurement on a first candidate satellite base station among the at least one candidate satellite base station; in response to determining that the first candidate satellite base station is available according to a result of the signal strength measurement, selecting the first candidate satellite base station as a target satellite base station; and in response to determining that the first candidate satellite base station is not available according to the result of the signal strength measurement, performing signal strength measurement on a second candidate satellite base station among the at least one candidate satellite base station.

The at least one candidate satellite base station may be determined as satellite base stations having an elevation angle with respect to the terminal greater than or equal to a predetermined threshold.

The elevation angle may be calculated based on ephemeris of the at least one candidate satellite base station.

The at least one candidate satellite base station may be determined as satellite base stations whose elevation angle with respect to the terminal is maintained above a predetermined threshold for a predetermined duration.

The predetermined duration may be configured based on a moving speed of each of the at least one candidate satellite base station.

The at least one candidate satellite base station may be determined as satellite base stations that provide the terminal with greater coverage than a current serving satellite base station of the terminal.

Furthermore, according to exemplary embodiments of the present disclosure, a timing adjustment method with a satellite base station, performed by a terminal, may comprise receiving a reference time delay value from the satellite base station; receiving a timing advance command from the satellite base station; and calculating an actual time delay value between the terminal and the satellite base station by using the reference time delay value and a value included in the timing advance command, and updating a timing advance value of the terminal for the satellite base station by using the calculated actual time delay value, wherein the value included in the timing advance command for initial access, timing advance maintenance, handover, or beam switching has a positive or negative value depending on the reference time delay value.

The reference time delay value may be a representative time delay value between the satellite base station and the terminal, which corresponds to a specific time point, a specific time interval, or a specific position of the satellite base station.

The reference time delay value may be received from the satellite base station through at least one of a physical downlink control channel (PDCCH), a radio resource control (RRC) signaling, and a medium access control (MAC) control element (CE).

The reference time delay value may be received from the satellite base station as included in ephemeris of the satellite base station.

When a new time delay value replacing the reference time delay value is received in a slot n, the terminal may use the new time delay value from a beginning of a slot (n+k+1) for calculating the actual time delay value between the terminal and the satellite base station, wherein each of n and k is an integer equal to or greater than 0.

Here, k may be defined as $k=[N_{slot}^{subframe,\mu} \cdot (N_{T,1}+N_{T,2}+N_{TA,max}+0.5)/T_{sf}]$, $N_{T,1}$ may be a time length of $N_1$ symbols corresponding to a physical downlink shared channel (PDSCH) reception time for processing capability of the terminal when additional PDSCH demodulation reference signal (DM-RS) is configured, $N_{T,2}$ may be a time length of $N_2$ symbols corresponding to a physical uplink shared channel (PUSCH) preparation time for processing capability of the terminal, $N_{TA,max}$ may be a maximum time delay within a cell of the satellite base station, $N_{slot}^{subframe,\mu}$ may be a number of slots per subframe, and $T_{sf}$ may be a time length of a subframe of 1 msec.

The reference time delay value may be set to a maximum time delay between the satellite base station and the terminal, a minimum time delay between the satellite base station and the terminal, or a time delay between a center of a cell and the satellite base station.

Furthermore, according to exemplary embodiments of the present disclosure, a method for receiving signals from a first satellite base station and a second satellite base station, performed by a terminal, may comprise obtaining information on a first bandwidth part (BWP) of the first satellite base station that is a serving base station, and information on a second BWP of the second satellite base station; providing information on a current position of the terminal to the first satellite base station; obtaining an estimated time delay value between the terminal and the second satellite base station from the first satellite base station; and estimating a time point at which a signal of the second satellite base station arrives at the terminal based on the estimated time delay value, and monitoring the second BWP for a period within a predetermined time range from the estimated time point, wherein the first satellite base station and the second satellite base station transmit signals at a same time.

The information on the first BWP and the information on the second BWP may be received from one of the first satellite base station and the second satellite base station through at least one of a physical downlink control channel (PDCCH), a medium access control (MAC) control element (CE), and a radio resource control (RRC) signaling, or received respectively from the first satellite base station and the second satellite base station through at least one of a PDCCH, a MAC CE, and an RRC signaling.

The information on the first BWP may be received from the first satellite base station as included in ephemeris of the first satellite base station, and the information on the second BWP may be received from the second satellite base station as included in ephemeris of the second satellite base station.

A guard band may be configured between the first BWP and the second BWP.

Each of the first BWP and the second BWP may be configured periodically, semi-persistently, or semi-periodically.

The obtaining of the estimated time delay value may further comprise receiving a difference value between a reference time delay value of the first satellite base station and the estimated time delay value from the first satellite base station; and calculating the estimated time delay value using the difference value and the reference time delay value.

The reference time delay value may be a representative time delay value between the first satellite base station and the terminal, which corresponds to a specific time point, a specific time interval, or a specific position of the first satellite base station.

According to the exemplary embodiments of the present disclosure, since transmission occasions of a physical random access channel (PRACH) for random access are determined by reflecting the distance between the satellite base station and the terminals, initial access between the terminals located at a long distance and the satellite base station can be stably performed. In addition, when using the timing adjustment method and the beam management method according to the exemplary embodiments of the present disclosure, it is made possible to stably maintain the connection state between the non-terrestrial base station and the terminal despite the position change of the non-terrestrial base station (e.g., satellite base station).

BRIEF DESCRIPTION OF DRAWINGS

Embodiments of the present disclosure will become more apparent by describing in detail embodiments of the present disclosure with reference to the accompanying drawings, in which:

FIG. 1 is a diagram illustrating a configuration of a RACH-ConfigCommon IE defined in the 3GPP NR system;

FIG. 2 is a diagram illustrating a configuration of a RACH-ConfigGeneric IE defined in the 3GPP NR system;

FIG. 3 is a conceptual diagram illustrating a concept of a common delay time and a differential delay time of signal transmission according to a position of a terminal in long distance communications;

FIG. 4 is a diagram for describing detailed information to be added to the RACH-ConfigCommon IE in order to perform the initial access method for long distance communications according to an exemplary embodiment of the present disclosure;

FIGS. 5 and 6 are conceptual diagrams for comparing the PRACH transmission occasion allocation result of the conventional 3GPP NR mobile communication system and the PRACH transmission occasion allocation result according to an exemplary embodiment of the present disclosure;

FIG. 7 is a diagram for describing the ServingCellConfigCommonSIB IE of the 3GPP NR system;

FIG. 8 is a diagram for describing the ssb-PositionsInBurst parameter in the ServingCellConfigCommon IE of the 3GPP NR system;

FIG. 9 is a diagram for describing TCI-Sate and QCL-Info parameters of the 3GPP NR system;

DETAILED DESCRIPTION

Figure 10:
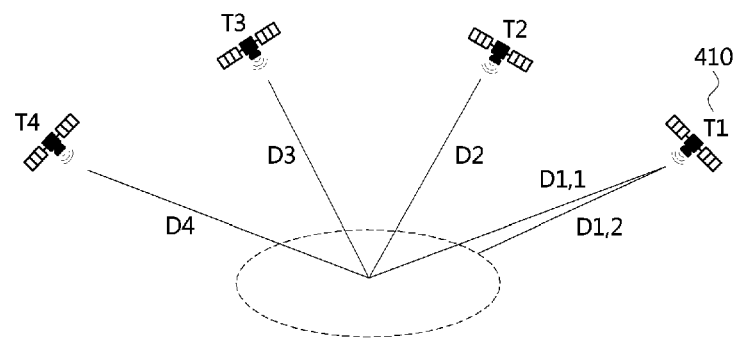
FIG. 10 is a conceptual diagram illustrating beam configuration according to time of a satellite base station to which exemplary embodiments of the present disclosure are applied.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

Exemplary embodiments according to the present disclosure improve the conventional 3GPP new radio (NR) mobile communication system to provide a timing adjustment method and a beam management method suitable for a mobile base station of a non-terrestrial network (NTN). In the following, reference is made to the following documents, which prescribe the operation of the 3GPP NR mobile communication system.

Reference 1: 3GPP TS 38.211 V15.3.0, "3rd Generation Partnership Project; Technical Specification Group Radio Access Network; NR; Physical channels and modulation (Release 15)"

Reference 2: 3GPP TS 38.212 V15.3.0, "3rd Generation Partnership Project; Technical Specification Group Radio Access Network; NR; Multiplexing and channel coding (Release 15)"

Reference 3: 3GPP TS 38.213 V15.3.0, "3rd Generation Partnership Project; Technical Specification Group Radio Access Network; NR; Physical layer procedures for data (Release 15)"

Reference 4: 3GPP TS 38.214 V15.3.0, "3rd Generation Partnership Project; Technical Specification Group Radio Access Network; NR; Physical layer procedures for data (Release 15)"

Reference 5: 3GPP TS 38.321 V15.3.0, "3rd Generation Partnership Project; Technical Specification Group Radio Access Network; NR; Medium Access Control (MAC) protocol specification (Release 15)"

Reference 6: 3GPP TS 38.331 V15.3.0, "3rd Generation Partnership Project; Technical Specification Group Radio Access Network; NR; Radio Resource Control (RRC) protocol specification (Release 15)"

Reference 7: 3GPP TS 38.133 V15.3.0, "3rd Generation Partnership Project; Technical Specification Group Radio Access Network; NR; Requirements for support of radio resource management (Release 15)"

Hereinafter, for convenience of description, the term 'satellite base station' is used as a term representing a non-terrestrial base station or a mobile base station. However, the methods and apparatuses described below may be applied not only to satellite base stations but also to base stations using airborne platforms, such as airships.

Initial Access Procedure of NR System

According to the clause 5.3.2 of Reference 1, a starting position $t_{start}^{RA}$ of a physical random access channel (PRACH) preamble in a subframe (when a subcarrier spacing (i.e., $\Delta f_{RA}$) of a PRACH preamble is 1.25, 5, 15, or 30 kHz) or in a 60 kHz slot (when $\Delta f_{RA}$ is 60 or 120 kHz) may be defined as Equation 1 below.

$$t_{start}^{RA} = t_{start,l}^{\mu} \qquad \text{[Equation 1]}$$

$$t_{start,l}^{\mu} = \begin{cases} 0 & l = 0 \\ t_{start,l-1}^{\mu} + (N_u^{\mu} + N_{CP,l-1}^{\mu}) \cdot T_c & \text{otherwise} \end{cases}$$

Here, the subframe or 60 kHz slot is assumed to start at t=0, a timing advance value $N_{TA}$ is assumed to be 0, $N_u^\mu$ and $N_{CP,l-1}^\mu$ are given by the clause 5.3.1 of Reference 1. Also, $\mu$ is assumed to be 0 when $\Delta f_{RA}$ is 1.25 or 5 kHz, and is given by $\Delta f_{RA}$ when $\Delta f_{RA}$ is 15, 30, 60, or 120 kHz.

The symbol location l is given by Equation 2 below.

$$l = l_0 + n_t^{RA} N_{dur}^{RA} + 14 n_{slot}^{RA}$$ [Equation 2]

Here, $l_0$ is given by the parameter "starting symbol" in Table 6.3.3.2-2 to 6.3.3.2-4 of Reference 1, $n_t^{RA}$ indicates a PRACH transmission occasion within a PRACH slot, numbered in increasing order from 0 to $n_t^{RA,slot}-1$. Here, the PRACH transmission occasion may also be referred to as 'PRACH occasion'. $n_t^{RA,slot}$ is given by Tables 6.3.3.2-2 to 6.3.3.2-4 of Reference 1 when $L_{RA}$ is 139, and fixed to 1 when $L_{RA}$ is 839.

$N_{dur}^{RA}$ is given by Tables 6.3.3.2-2 to 6.3.3.2-4 of Reference 1, and $N_{slot}^{RA}$ is 0 when $\Delta f_{RA}$ is 1.25, 5, 15, or 60 kHz, 1 when $\Delta f_{RA}$ is 30 or 120 kHz, either of "Number of PRACH slots within a subframe" in Tables 6.3.3.2-2 to 6.3.3.2-3 or "Number of PRACH slots within a 60 kHz slot" in Table 6.3.3.2-4 is equal to 1. Otherwise, $N_{slot}^{RA}$ may belong to $\{0,1\}$ (i.e., $N_{slot}^{RA} \in \{0,1\}$).

If a preamble format given by Tables 6.3.3.2-2 to 6.3.3.2-4 is A1/B1, A2/B2 or A3/B3, and $n_t^{RA} = N_t^{RA,slot}-1$, a PRACH preamble with the corresponding PRACH preamble format from B1, B2 and B3 is transmitted in the PRACH transmission occasion. Otherwise, the PRACH preamble with the corresponding PRACH preamble format from A1, A2 and A3 is transmitted in the PRACH transmission occasion.

Meanwhile, according to the clause 6.3.3.2 of Reference 1, PRACH resource allocation is performed as follows.

Random access preambles can only be transmitted in the time resources given by the higher-layer parameter prach-ConfigurationIndex according to Tables 6.3.3.2-2 to 6.3.3.2-4 of Reference 1. Also, the random access preambles can only be transmitted in the frequency resources given by the higher-layer parameter msg1-FrequencyStart. The PRACH frequency resources $n_{RA} \in \{0,1, M-1\}$, where M equals the higher-layer parameter msg1-FDM, are numbered in increasing order within an initial active uplink bandwidth part (BWP) during initial access, starting from the lowest frequency. Otherwise, $n_{RA}$ are numbered in increasing order within an active uplink BWP, starting from the lowest frequency. For the purpose of slot numbering in the tables, the following subcarrier spacings are assumed in Tables 6.3.3.2-2 to 6.3.3.2-4 of Reference 1.

15 kHz for frequency range 1 FR1 (below 6 GHz band)
60 kHz for frequency range 2 FR2 (above 6 GHz band)

In addition, the PRACH resource allocation according to the clause 8.1 of Reference 3 is as follows.

a physical random access procedure is triggered upon request of a PRACH transmission by higher layers or by a physical downlink control channel (PDCCH) order. A configuration by higher layers for a PRACH transmission includes the following:

A configuration for PRACH transmission.
A preamble index, a preamble SCS, $P_{PRACH,target}$, a corresponding RA-RNTI, and a PRACH resource.

A terminal is provided R contention-based preambles per SS/PBCH block per valid PRACH occasion by a higher layer parameter ssb-perRACH-OccasionAndCB-Preambles-PerSSB. Also, the terminal is provided N SS/PBCH blocks associated with one PRACH occasion.

When N<1, one SS/PBCH block is mapped to 1/N consecutive valid PRACH occasions. In this case, R contention-based preambles with consecutive indexes associated with SS/PBCH block n, $0 \le n \le N-1$, per valid PRACH occasion start from preamble index 0.

When $N \ge 1$, R contention-based preambles with consecutive indexes associated with SS/PBCH block n, $0 \le n \le N-1$, per valid PRACH occasion start from preamble index $n \cdot N_{preamble}^{total}/N$ where $N_{preamble}^{total}$ is provided by a higher layer parameter totalNumberOfRA-Preambles and is an integer multiple of N. SS/PBCH block indexes are mapped to valid PRACH occasions in the following order (hereinafter, 'mapping scheme a').

First, in increasing order of preamble indexes within a single PRACH occasion
Second, in increasing order of frequency resource indexes for frequency multiplexed PRACH occasions
Third, in increasing order of time resource indexes for time multiplexed PRACH occasions within a PRACH slot
Fourth, in increasing order of indexes for PRACH slots An association period, starting from frame 0, for mapping SS/PBCH blocks to PRACH occasions is the smallest value in a set determined by the PRACH configuration period according Table 8.1-1 of Reference 3 such that $N_{Tx}^{SSB}$ SS/PBCH blocks are mapped at least once to the PRACH occasions within the association period. Here, a terminal obtains $N_{Tx}^{SSB}$ from a value of ssb-PositionsInBurst in SystemInformationBlockType1 and/or in ServingCellConfigCommon. If after an integer number of SS/PBCH blocks to PRACH occasions mapping cycles within the association period there is a set of PRACH occasions that are not mapped to $N_{Tx}^{SSB}$ SS/PBCH blocks, no SS/PBCH blocks are mapped to the set of PRACH occasions. An association pattern period includes one or more association periods and is determined so that a pattern between PRACH occasions and SS/PBCH blocks repeats at most every 160 msec. PRACH occasions not associated with SS/PBCH blocks after an integer number of association periods, if any, are not used for PRACH transmissions.

For a PRACH transmission triggered by a PDCCH order, the PRACH mask index field (refer to Reference 2), if the value of the random access preamble index field is not zero, indicates the PRACH occasion for the PRACH transmission. Here, the PRACH occasions are associated with the SS/PBCH block index indicated by the SS/PBCH block index field of the PDCCH order. The PRACH occasions are mapped consecutively per corresponding SS/PBCH block index. The indexing of the PRACH occasion indicated by the mask index value is reset per mapping cycle of consecutive PRACH occasions per SS/PBCH block index.

The terminal selects for a PRACH transmission the PRACH occasion indicated by PRACH mask index value for the indicated SS/PBCH block index in the first available mapping cycle. For the indicated preamble index, the ordering of the PRACH occasions is as follows (hereinafter, 'mapping scheme b').

First, in increasing order of frequency resource indexes for frequency multiplexed PRACH occasions
Second, in increasing order of time resource indexes for time multiplexed PRACH occasions within a PRACH slot
Third, in increasing order of indexes for PRACH slots According to the clause 5.1 of Reference 5, the RRC configures the following parameters for the random access procedure. Only parameters relevant to exemplary embodiments of the present disclosure are described, and each parameter is described in more detail below.

prach-ConfigurationIndex: the available set of PRACH occasions for the transmission of the Random Access Preamble rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecovery-Config information element (IE)

rsrp-ThresholdSSB-SUL: an RSRP threshold for the selection between the NUL carrier and the SUL carrier ra-ssb-OccasionMaskIndex: defines PRACH occasion(s) associated with an SSB in which the MAC entity may transmit a Random Access Preamble (see the clause 7.4 of Reference 5)

ra-OccasionList: defines PRACH occasion(s) associated with a CSI-RS in which the MAC entity may transmit a Random Access Preamble ssb-perRACH-OccasionAndCB-PreamblesPerSSB (SpCell only): defines the number of SSBs mapped to each PRACH occasion and the number of contention-based Random Access Preambles mapped to each SSB RACH-ConfigCommon FIG. 1 is a diagram illustrating a configuration of a RACH-ConfigCommon IE defined in the 3GPP NR system.

The RACH-ConfigCommon IE is used to specify cell-specific random access parameters. Referring to FIG. 1 and the clause 6.3.2 of Reference 6, the detailed information of the RACH-ConfigCommon IE is configured as follows.

rsrp-ThresholdSSB: The terminal may select the SS block and corresponding PRACH resource for path-loss estimation and (re)transmission based on SS blocks that satisfy the threshold (see Reference 3)

rsrp-ThresholdSSB-SUL: The terminal selects SUL carrier to perform random access based on this threshold (see the clause 5.1.1 of Reference 5). The value applies to all the BWPs.

ssb-perRACH-OccasionAndCB-PreamblesPerSSB: The meaning of this field is twofold: the CHOICE conveys the information about the number of SSBs per RACH occasion (L1 parameter 'SSB-per-rach-occasion'). Value oneEight corresponds to one SSB associated with 8 RACH occasions, value oneFourth corresponds to one SSB associated with 4 RACH occasions, and so on. The ENUMERATED part indicates the number of contention-based preambles per SSB (L1 parameter 'CB-preambles-per-SSB'). For example, a value n4 corresponds to 4 contention-based preambles per SSB, and a value n8 corresponds to 8 contention-based preambles per SSB, and so on. The total number of CB preambles in a RACH occasion is given by CB-preambles-per-SSB*max(1, SSB-per-rach-occasion).

totalNumberOfRA-Preambles: The total number of preambles used for contention based and contention free random access in the RACH resources defined in RACH-ConfigCommon, excluding preambles used for other purposes (e.g. for SI request). If the field is absent, the all 64 preambles are available for RA. The setting should be consistent with the setting of ssb-perRACH-OccasionAndCB-PreamblesPerSSB, i.e. it should be a multiple of the number of SSBs per RACH occasion.

RACH-ConfigGeneric

FIG. 2 is a diagram illustrating a configuration of a RACH-ConfigGeneric IE defined in the 3GPP NR system.

The RACH-ConfigGeneric IE is used to specify cell-specific random access parameters for beam failure recovery as well as normal random access. Referring to FIG. 2, detailed information of the RACH-ConfigGeneric IE may be configured as follows.

msg1-FDM: The number of PRACH transmission occasions FDMed in one time instance. (see the clause 6.3.3.2 of Reference 1)

prach-ConfigurationIndex: PRACH configuration index. For prach-ConfigurationIndex configured under beamFailureRecovery-Config, the prach-ConfigurationIndex can only correspond to the short preamble format. This may correspond to the L1 parameter 'PRACHConfigurationIndex' (see the clause 6.3.3.2 of Reference 1).

preambleReceivedTargetPower: The target power level at the network receiver side (see the clause 7.4 of Reference 3, and the clauses 5.1.2 and 5.1.3 of Reference 5). Only multiples of 2 dBm may be chosen (e.g., −202, −200, −198, . . . ).

preambleTransMax: The maximum number of RA preamble transmission performed before declaring a failure (see the clauses 5.1.4 and 5.1.5 of Reference 5).

Initial Access Method for Long Distance Communications

As described above, in the initial access procedure of the NR system, the RACH transmission occasion(s) are allocated to the SS/PBCH block, and the RACH transmission occasions are assigned in the order of preamble indexes, frequency resource indexes, time resource indexes, and slot indexes using RRC parameters.

However, when considering long-distance communications such as non-terrestrial network (NTN), which is currently being standardized in the 3GPP, large differences between signal propagation times according to the positions of terminals may occur as the cell radius and the altitude of the base station (e.g., satellite base station) are increased.

FIG. 3 is a conceptual diagram illustrating a concept of a common delay time and a differential delay time of signal transmission according to a position of a terminal in long distance communications.

Referring to FIG. 3, illustrated are a delay time (i.e., common delay) according to a distance 311 between a satellite base station 301 and a terminal 310 vertically below the satellite base station 301, and a delay time (i.e., common delay+differential delay) between a distance 321 between the satellite base station 301 and a terminal 320 that may be located in various positions.

That is, the delay time for the terminal 310 and the delay time for the terminal 320 may have a difference as much as the differential delay. In this case, an arrival time at the satellite base station 301 of a PRACH preamble transmitted from the terminal 310 and an arrival time at the satellite base station 301 of a PRACH preamble transmitted from the terminal 320 may have a large difference. Thus, if the PRACH transmission occasion allocation scheme of the NR system is used, it is difficult to distinguish PRACH preambles of terminals.

In order to solve this problem, in the initial access method according to an exemplary embodiment of the present disclosure, one cell may be divided into zones, and PRACH transmission occasions may be allocated according to the zones of the cell. That is, terminals located in the same zone (areas having similar distances from the base station) may perform PRACH transmission at similar times.

FIG. 4 is a diagram for describing detailed information to be added to the RACH-ConfigCommon IE in order to perform the initial access method for long distance communications according to an exemplary embodiment of the present disclosure.

Referring to FIG. 4, at least two or more thresholds for determining PRACH occasions may be further defined within the RACH-ConfigCommon IE. For example, ThresholdSSB-TA$_1$, . . . , and ThresholdSSB-TA$_N$ may be additionally configured in RACH-ConfigCommon. Here, they may be configured as ThresholdSSB-TA$_N$≤ . . . ≤ThresholdSSB-TA$_1$, where N is a natural number of 2 or more.

The terminal may receive an SS/PBCH block transmitted by the base station, measure a reference signal received power (RSRP) of the received SS/PBCH block, and select a ThresholdSSB-TA$_n$ (1≤n≤N) to be applied to itself by comparing the measured RSRP with RSRP ranges of ThresholdSSB-TA$_1$, . . . , and ThresholdSSB-TA$_N$ defined in RACH-ConfigCommon. That is, the ThresholdSSB-TA$_n$ (1≤n≤N) selected by the terminal may be used to allocate a PRACH transmission occasion in place of the aforementioned rsrp-ThresholdSSB.

Meanwhile, in RACH-ConfigCommon, each of ThresholdSSB-TA$_1$, . . . , and ThresholdSSB-TA$_N$ may be set to a ratio, not the RSRP range. Here, the ratio may represent not only a difference in signal strengths but also a difference in reception times of the SS/PBCH block between cells or beams. In this case, the terminal may use a ratio of the RSRP measured for the SS/PBCH block that is the target of PRACH transmission occasion allocation and an RSRP measured for another SS/PBCH block of a neighbor cell (or the same cell) to determine ThresholdSSB-TA$_n$. Here, the RSRP may be replaced with a reference signal received quality (RSRQ), a signal-to-noise ratio (SNR), and/or a signal-to-interference and noise ratio (SINR). Hereinafter, it is assumed that the RSRP is used for convenience.

On the other hand, as described above, the number of PRACH occasions per SS/PBCH block is determined by the ssb-perRACH-OccasionAndCB-PreamblesPerSSB field. The number of PRACH occasions per SS/PBCH block is at most 8 to at least ⅟16. The number of PRACH occasions per SS/PBCH block indicated by the ssb-perRACH-OccasionAndCB-PreamblesPerSSB field includes the number of PRACH occasions that are frequency multiplexed by the msg1-FDM field of the RACH-ConfigGeneric IE. The number of PRACH occasions in one instant frequency axis as determined by msg1-FDM is at most 8 and at least 1. As a result, PRACH occasions per SS/PBCH block may have (R/M) occasions on the time axis.

In the following, R indicates the number of PRACH occasions per SS/PBCH block (L1 parameter 'SSB-per-rach-occasion') determined by the ssb-perRACH-OccasionAndCB-PreamblesPerSSB field, and M denotes a msg1-FDM value. A candidate value of R may belong to {8, 4, 2, 1, ½, ⅓, ⅛, ⅟16}, and a candidate value of M may belong to {1, 2, 4, 8}.

FIGS. 5 and 6 are conceptual diagrams for comparing the PRACH transmission occasion allocation result of the conventional 3GPP NR mobile communication system and the PRACH transmission occasion allocation result according to an exemplary embodiment of the present disclosure.

Referring to FIG. 5, the PRACH occasion allocation result for the case of R=2, M=2, and S=2 is shown. Here, S indicates the number of SS/PBCH blocks. That is, FIG. 5 exemplifies a case where N=1 (that is, only rsrp-ThresholdSSB is configured in the RACH-ConfigCommon IE as in the conventional method).

In this case, the mapping scheme a and the mapping scheme b may be applied, and the terminal 310 and the terminal 320 illustrated in FIG. 3 may have a problem in which they may be assigned PRACH transmission occasions regardless of their distances to the satellite base station 301.

Referring to FIG. 6, the RACH opportunity allocation result for the case of R=2, M=2, S=2, and N=2 is shown. The terminal may select n=1 or n=2 using the RSRP measured for the SS/PBCH block received by the terminal. Accordingly, RACH transmission occasions are allocated to terminals belonging to the same cell zone at the same time. For example, terminals selecting n=1 are given PRACH transmission occasions at a first time point on the time axis, and terminals selecting n=2 are given PRACH transmission occasions at a second time point on the time axis.

In order to reflect this, the above-described mapping scheme a may be changed in two ways as follows. In the following, they may be referred to as 'mapping scheme c-1' and 'mapping scheme c-2'. Meanwhile, changed points of c-1 and c-2 from the mapping scheme a may be applied to the mapping method b as they are.

(1) Mapping Scheme c-1

The mapping scheme c-1 is a scheme of applying the aforementioned mapping scheme a to each n. If (R/M)/N≥1 and N≥2, the total PRACH occasions within a PRACH slot may be divided into ceil [(R/M)/N] groups according to their time resource indices. Each group of the divided PRACH transmission occasions may be mapped to n (1≤n≤N). That is, each group of the PRACH transmission occasions divided on the time axis may correspond to ThresholdSSB-TAn (1≤n≤N).

For example, if R=8, M=2, and S=4, the total number of the PRACH transmission occasions on the time axis is 16 (=(R/M)*S), and when N is 2, the number of PRACH transmission occasions per n on the time axis is 8. Since the number of PRACH transmission occasions per SS/PBCH block is 8 (=R), the number of PRACH transmission occasions for each n of one SS/PBCH block is 4, and the number of PRACH transmission occasions for each n of one SS/PBCH block on the time axis is 2. The following scheme is applied for the PRACH transmission occasions divided for each n (≥1).

First, in increasing order of preamble indexes within a single PRACH occasion
Second, in increasing order of frequency resource indexes for frequency multiplexed PRACH occasions
Third, in increasing order of time resource indexes for time multiplexed PRACH occasions within a PRACH slot
Fourth, in increasing order of indexes for PRACH slots (2) Mapping Scheme c-2

The mapping scheme c-2 is a scheme of increasing the transmission occasions per SS/PBCH block by N times. In this case, the PRACH occasions per SS/PBCH block is R*N, which is different from R, which is the PRACH occasions per SSB of the mapping scheme c-1. For each n (≥1) the following scheme is applied.

First, in increasing order of preamble indexes within a single PRACH occasion
Second, in increasing order of frequency resource indexes for frequency multiplexed PRACH occasions
Third, in increasing order of time resource indexes for time multiplexed PRACH occasions within a PRACH slot
Fourth, in increasing order of indexes for PRACH slots In this case, if all R occasions per SS/PBCH block are completed, even when the frequency multiplexed PRACH transmission occasions remain, the next time resource index is used without using the remaining PRACH transmission occasions.

Meanwhile, in another exemplary embodiment of the present disclosure, ThresholdSSB-TA$_1$ to ThresholdSSB-TA$_N$ of the RACH-ConfigCommon IE may be replaced with a parameter called RNG. The RNG is a parameter representing N. In this case, since the terminal does not know n, the terminal may assume n to be 1 and perform PRACH transmission in a PRACH transmission occasion corresponding to n=1. If the initial access fails, the terminal may increase n by 1 (up to N), and may perform PRACH transmission in a PRACH transmission occasion corresponding to increased n. Here, a procedure similar to a transmission beam switching method for configuring a transmission beam at the initial access of the terminal may be applied. In this case, when increasing n to n+1, a power ramping counter by powerRampingStep in the RACH-ConfigGeneric IE may not be increased.

Alternatively, the terminal may apply the above method according to whether it is a terminal having its own position identifying function or a terminal having no corresponding function. In this case, for example, it may be assumed that N=2 (with or without the position identifying function), and the corresponding PRACH occasions may be distinguished according to R, M, and S. In this case, signaling may be configured with a 1 bit parameter in an RRC parameter, SIB, or MIB as an indicator for whether or not to classify the PRACH occasions according to whether the position information is identified. When the indicator is set to 0, there is no PRACH occasion classification, and when the indicator is set to 1, there is PRACH occasion classification. Alternatively, each PRACH occasion may be distinguished by an index of a subframe where the PRACH occasion start after configuring subframe indexes for the respective cases (with or without the position identifying function).

In addition, the PRACH may be repeatedly transmitted according to a parameter PRACH_repeat. The PRACH_repeat is a parameter representing Q. For the mapping schemes a, b, c-1, and c-2, the time resource index for PRACH transmission occasions per SS/PBCH block may be increased for Q, and then the frequency resource index for PRACH transmission occasions per SS/PBCH block may be increased.

Meanwhile, in another exemplary embodiment of the present disclosure, a parameter Lc_os representing information related to a position may be used. This may indicate a direct position (longitude, latitude) of the base station, or may indicate a time difference for the base station.

For example, when Lc_os represents a time difference and Lc_os is v, this may indicate that the base station indicates v slot(s) or v symbol(s). 15 kHz subcarrier spacing may be applied to the v slot(s) or v symbol(s) in FR1, and 60 kHz subcarrier spacing or another subcarrier spacing may be applied to the v slot(s) or v symbol(s) in FR2. Here, the base station may be a transparent node or a regenerative node. When receiving the Lc_os, the terminal may assume that the minimum time difference due to the delay according to the distance between the base station and the terminal is v. v may be a specific time difference defined by the base station or the terminal rather than the minimum time difference. In this case, the terminal may perform PRACH transmission at a time (t−v) which is earlier by v than a time t configured for the corresponding PRACH occasion. In other words, in the state in which downlink synchronization is acquired after receiving the SS/PBCH block of the base station, the terminal may transmit the PRACH at a time that is earlier than the transmission time of the subframe wherein the corresponding PRACH occasion is allocated. If the initial access fails, the terminal may set a time offset, and perform the next PRACH transmission at a time (e.g., t−v−time offset) earlier than the time (t−v) for the previous transmission or at a time (e.g., t−v+time offset) later than the time (t−v) for the previous transmission.

The time offset is a parameter that reflects the time difference when retransmitting the PRACH. This may be applicable even when v=0 or Lc_os is absent. If the retransmission continues, the time offset may be additionally reflected to the previous transmission.

On the other hand, if Lc_os represents the position of the base station and the terminal is able to estimate its own position, the terminal may estimate a time difference with the base station (i.e., time difference according to the distance between the terminal and the base station), and if the estimated value is v', the above-described scheme may be used by replacing v with v'.

PRACH Preamble Format

In case of PRACH preamble formats, Table 6.3.3.1-1 of Reference 1 may also be applied to FR2. In addition, for the three PRACH configuration indexes shown in Table 1 below, {1, 4, 7} may be replaced with {1, 7}, {2, 5, 8} may be replaced with {2, 8}, and {3, 6, 9} may be replaced with {3, 9}, or indexes for them may be added to Table 6.3.3.1-1 of Reference 1.

TABLE 1

| PRACH Configuration Index | | | | | | | | |
|---|---|---|---|---|---|---|---|---|
| 50 | 1 | 1 | 0 | 1, 4, 7 | 0 | — | — | 0 |
| 51 | 1 | 1 | 0 | 2, 5, 8 | 0 | — | — | 0 |
| 52 | 1 | 1 | 0 | 3, 6, 9 | 0 | — | — | 0 |

Group Initial Access

When a group handover or the like occurs, a plurality of terminals belonging to a previous (source) base station may transmit PRACHs at a specific time Ts. Ts may be informed by the base station to the plurality of terminals. In this case, since a collision may occur when several terminals transmit PRACHs at the same time, each of terminals informed of Ts may select a random value Tx within a range of 0 to Tm, and perform PRACH transmission in a PRACH occasion after (Ts+Tx). Here, Tm may be a cell specific value set by the base station and is a parameter that can be transmitted to a plurality of terminals. This may replace ra-ContentionResolutionTimer value included in the RACH-ConfigCommon IE. In addition, when the base station transmits a specific Tx value per terminal as a terminal specific value, the terminal may transmit a PRACH in a PRACH occasion after (Ts+Tx).

Timing Adjustment Procedure of NR System

According to the clause 4.2 of Reference 3, the timing adjustment of the 3GPP NR system can be configured as follows.

A terminal may be provided a value $N_{TA\_offset}$ of a timing advance offset for a serving cell by n-TimingAdvanceOffset for a serving cell. When the terminal is not provided n-TimingAdvanceOffset for a serving cell, the terminal determines a default value $N_{TA\_offset}$ of the timing advance offset for the serving cell as described in the clause 7.1.2 of Reference 7.

When a terminal is configured with two UL carriers for a serving cell, a same timing advance offset value $N_{TA\_offset}$ applies to both carriers. Upon reception of a timing advance command or of a timing adjustment indication for a timing advance group (TAG), the terminal adjusts uplink timing for PUSCH, sound reference signal (SRS), and PUCCH transmission on all the serving cells in the TAG based on a value $N_{TA\_offset}$.

The timing adjustment indication according to Reference 5 indicates an initial time alignment value $N_{TA}$ used for a TAG. For a SCS of $2^\mu \cdot 15$ kHz, the timing advance command for a TAG indicates the change of the uplink timing relative to the current uplink timing for the TAG in multiples of $16 \cdot 64 \cdot T_c/2^\mu$.

In case of random access response, a timing advance command (see the clause 6.2.3 of Reference 5), $T_A$, for a TAG indicates $N_{TA}$ values by index values of $T_A = 0, 1, 2, \ldots, 3846$, where an amount of the time alignment for the TAG with SCS of $2^\mu \cdot 15$ kHz is $N_{TA} = T_A \cdot 16 \cdot 64/2^\mu$. $N_{TA}$ is defined in Reference 1 and is relative to the subcarrier spacing of the first uplink transmission from the terminal after the reception of the random access response.

In other cases, a timing advance command (see the clause 6.1.3.4 of Reference 5), $T_A$, for a TAG indicates adjustment of a current $N_{TA}$ value, $N_{TA\_old}$, to the new $N_{TA}$ value, $N_{TA\_new}$, by index values of $T_A = 0, 1, 2, \ldots, 63$, where for a SCS of $2^\mu \cdot 15$ kHz, $N_{TA\_new} = N_{TA\_old} + (T_A - 31) \cdot 16 \cdot 64/2^\mu$. Adjusting the $N_{TA}$ value by a positive or negative value indicates to advance or delay the uplink transmission timing for the TAG by a corresponding amount, respectively.

For a timing advance command received on uplink slot, the corresponding adjustment of the uplink transmission timing applies from the beginning of uplink slot n+k+1 where $k = [N_{slot}^{subframe,\mu} \cdot (N_{T,1} + N_{T,2} + N_{TA,max} + 0.5)/T_{sf}]$, $N_{T,1}$ is a time duration of $N_1$ symbols corresponding to a PDSCH reception time for UE processing capability 1 when additional PDSCH DM-RS is configured, $N_{T,2}$ is a time duration of $N_2$ symbols corresponding to a PUSCH preparation time for UE processing capability 1, $N_{TA,max}$ is the maximum timing advance value that can be provided by a TA command field of 12 bits, $N_{slot}^{subframe,\mu}$ is a number of slots per subframe, and $T_{sf}$ is the subframe duration of 1 msec.

$N_1$ and $N_2$ are determined with respect to the minimum subcarrier spacing among the subcarrier spacings of all configured UL BWPs for all uplink carriers in a TAG and of their corresponding configured DL BWPs. The slot n and $N_{slot}^{subframe,\mu}$ are determined with respect to the minimum subcarrier spacing among the subcarrier spacings of all configured UL BWPs for all uplink carriers in the TAG. $N_{TA,max}$ is determined with respect to the minimum subcarrier spacing among the subcarrier spacings of all configured UL BWPs for all uplink carriers in the TAG and for the initial active UL BWP provided by a higher layer parameter initialuplinkBWP.

Satellite Ephemeris

Key parameters of the orbital dynamics of all commercial satellites are publicly available. This information is called astronomy or ephemeris and is used by astronomers to describe the position and orbital motion of stars and other objects.

The ephemeris for each object is represented by an American Standard Code for Information Interchange (ASCII) file using a Two-Line Element (TLE) format. The TLE data format encodes a list of orbital elements of earth's orbital objects, such as satellites, into two 70 columns. The TLE is the de facto standard for this information.

With the TLE format data, several models are available that can calculate the position of an object rotating around the earth as a function of time at earth-centered and earth-fixed (ECEF) Cartesian x, y, and z coordinates. Also, the instantaneous velocity of the object at that time can be obtained. In the ECEF coordinates, the z axis points to the actual north, and the x and y axes intersect the latitude and longitude of 0 degrees, respectively. With the appropriately selected time information (epoch) for the object, the ephemeris is computed as x, y, z coordinates of regular intervals, the coordinates, and a time variation of the x, y, z coordinates, which are configured in easy-to-use table. The instantaneous position and velocity of the object can be interpolated in a table entry for an arbitrary point in time. When necessary, the position of the object can be converted to latitude, longitude, and altitude.

Hereinafter, a handover method of a connected mode terminal using the satellite ephemeris will be described.

When the position of the satellite and the terminal (or earth station) is expressed in ECEF coordinates, the azimuth and elevation, which direct the satellite, may be determined. This information may be used by the antenna steering mechanism for initial antenna pointing of a new satellite to be used.

Thus, the terminal may generate a list of potential handover candidates at any given time. For example, the list of handover candidates may be generated by searching for current and next epochs of satellite base stations in the network, which have an elevation angle from the terminal is above a certain threshold. In addition, the list of handover candidates may include a satellite base station currently serving.

The terminal-initiated handover may be triggered when the elevation angle of the serving satellite base station currently serving the terminal changes below the certain threshold. Thereafter, the terminal may select at least one candidate satellite base station from the list of handover candidates. In an exemplary embodiment, the at least one candidate satellite base station may have a higher elevation than the current serving satellite base station. In addition, this elevation should be kept above the threshold for a predetermined duration to minimize frequent handovers. The predetermined duration may be determined by the velocity of the candidate satellite base station. In another exemplary embodiment, the terminal may select at least one candidate base station with longer coverage than the current serving satellite base station in the list of handover candidates.

When at least one candidate satellite base station is selected, the terminal may perform signal strength measurement to verify the availability of the selected at least one candidate satellite base station. In this case, the terminal may perform the signal strength measurement from the candidate satellite base station having the best elevation angle (or coverage).

When it is determined that the candidate satellite base station having the measured signal strength is available as a result of the signal strength measurement, the terminal may finally determine the candidate satellite base station as a target satellite base station (of the handover). When the signal strength measurement determines that the candidate satellite base station for which the signal strength was measured is not available (e.g., when the satellite base station is blocked by a terrain or a building), based on the signal strength measurement result for other candidate satellite base stations, the final target satellite base station can be determined.

On the other hand, if all candidate satellite base stations are not immediately available, the terminal may continue to use the current serving satellite base station while continuing to measure signal strengths until available candidate satellite base stations are determined.

Similarly, depending on the positions of the available satellite base station and the terminal, a beam-to-beam handover within the same satellite base station may be performed based on a beam pattern of the corresponding satellite base station. The terminal may determine a reference boresight for the satellite base station from the position of the satellite base station indicated by the ECEF coordinates. In consideration of the trajectory of the corresponding satellite base station and the position of the terminal, it may be determined to apply the beam patterns of the serving beam and the candidate beam for handover of the satellite base station. When the terminal crosses a boundary between the serving beam and the candidate beam, one beam for the beam handover may be triggered.

SS/PBCH Block Configuration of NR System

According to the clause 4.1 of Reference 3, a synchronization signal block (SSB), hereinafter also referred to as a synchronization signal/physical broadcast channel (SS/PBCH) block, of the 3GPP NR system is configured as follows.

Candidate SS/PBCH blocks in a half frame are indexed in an ascending order in time from 0 to L−1. A terminal determines the 2 LSB bits, for L=4, or the 3 LSB bits, for L>4, of a SS/PBCH block index per half frame from a one-to-one mapping with an index of the DM-RS sequence transmitted in the PBCH. For L=64, the terminal determines the 3 MSB bits of the SS/PBCH block index per half frame from PBCH payload bits $\bar{a}_{\bar{A}+5}$, $\bar{a}_{\bar{A}+6}$, $\bar{a}_{\bar{A}+7}$ as described in the clause 4 of Reference 2.

The terminal may be provided per serving cell by a higher layer parameter ssb-periodicityServingCell a periodicity of the half frames for reception of the SS/PBCH blocks for the serving cell. When the terminal is not configured a periodicity of the half frames for receptions of the SS/PBCH blocks, the terminal assumes a periodicity of a half frame. A terminal assumes that the periodicity is same for all SS/PBCH blocks in the serving cell.

For SS/PBCH blocks that provide a higher layer parameter MasterInformationBlock (MIB), the terminal may be configured by a parameter ssb-PositionsInBurst of SystemInformationBlockType1 (SIB1). The ssb-PositionsInBurst is a parameter indicating the indexes of the SS/PBCH blocks so that the terminal does not receive other signals or channels with respect to resource elements (REs) overlapping with REs corresponding to the SS/PBCH blocks. The ssb-PositionsInBurst may also be included in the ServingCellConfigCommon IE for setting cell specific parameters. The terminal expects that the configuration provided by ssb-PositionsInBurst in ServingCellConfigCommon will be the same as the configuration provided by ssb-PositionsInBurst in SystemInformationBlockType1.

FIG. 7 is a diagram for describing the ServingCellConfigCommonSIB IE of the 3GPP NR system, and FIG. 8 is a diagram for describing the ssb-PositionsInBurst parameter in the ServingCellConfigCommon IE of the 3GPP NR system.

In FIG. 7, detailed components of the ServingCellConfigCommonSIB IE described in Reference 6 are shown. The ssb-PostionsInBurst parameter included in the ServingCellConfigCommonSIB IE of FIG. 7 represents indices of SS/PBCH blocks transmitted in a synchronization signal (SS) burst in a hierarchical manner of inOneGroup and groupPresence represented by 8 bits, respectively. Here, inOneGroup identifies a group and groupPresence identifies an SSB within the group.

In FIG. 8, the ssb-PostionsInBurst parameter of ServingCellConfigCommon IE described in Reference 6 may include bitmaps indicating time domain positions of SS/PBCH blocks transmitted within the SS burst. For example, the first (i.e., leftmost) bit of each bitmap corresponds to SS/PBCH block index 0, and the second bit of each bitmap corresponds to SS/PBCH block index 1. In the bitmap, a value of 0 indicates that the corresponding SS/PBCH block is not transmitted and a value of 1 indicates that the corresponding SS/PBCH block is transmitted.

Meanwhile, an antenna port quasi-co-location (QCL) may be configured as follows according to the clause 5.1.5 of Reference 4.

A terminal receives an activation command (see the clause 6.1.3.14 of Reference 5) used to map up to 8 transmission configuration indication (TCI) states to codepoints of a DCI field Transmission Configuration Indication. When an HARQ-ACK corresponding to a PDSCH carrying the activation command is transmitted in a slot n, the indicated mapping between TCI states and codepoints of the DCI field Transmission Configuration Indication should be applied starting from a slot $n+3N_{slot}^{subframe,\mu}+1$.

FIG. 9 is a diagram for describing TCI-Sate and QCL-Info parameters of the 3GPP NR system.

Before the terminal receives the higher layer configuration of the TCI states and before receiving the activation command, the terminal may assume that DM-RS ports of the PDSCH of the serving cell have a QCL relationship with the SS/PBCH block determined at initial access for 'QCL-TypeA' and 'QCL-TypeD' (if applicable).

Timing Adjustment Method for Satellite Base Station

Hereinafter, as a time synchronization configuration method for a satellite base station according to an exemplary embodiment of the present disclosure, a time synchronization configuring method for a single satellite base station and a time synchronization configuration method for a plurality of satellite base stations will be described.

(1) Timing Adjustment Method for a Single Satellite Base Station

The satellite base station is a mobile base station whose position changes with time, and may be a transparent base station or a re-generative base station. In exemplary embodiments of the present disclosure, the satellite base station may be assumed to be a low earth orbit (LEO), a medium earth orbit (MEO) or a geostationary equatorial orbit (GEO) satellite.

FIG. 10 is a conceptual diagram illustrating beam configuration according to time of a satellite base station to which exemplary embodiments of the present disclosure are applied.

Referring to FIG. 10, a mobile satellite base station 410 is shown. T1 to T4 represent specific time points (or time intervals), and D1,1, D1,2, and D2 to D4 represent time delays according to the distance between the satellite base station 410 and the cell. Where D1,1 represents the time delay from the center of the cell to the satellite base station 410 and D1,2 represents the minimum time delay from the cell to the satellite base station 410. For example, the time delay between the cell and the satellite base station may be set based on the cell center and may be set to the minimum time delay or the maximum time delay or a specific time delay defined by the base station. Hereinafter, for convenience, the time delay at the time point T1 will be described as a representative value D1 instead of D1,1 or D1,2 (that is, D2 to D4 are also representative values of the time delay at the time points T2 to T4, respectively). D1 to D4 may be different according to the movement of the satellite base station. In the following description, D1 to D4 are referred to as 'reference time delay values' at specific time points (or time intervals) corresponding thereto or at specific positions of the satellite base station corresponding thereto.

The terminal may acquire an $N_{TA}$ value from a random access response for PRACH transmission at initial access, and the $N_{TA}$ value may be continuously updated by a timing advance command from $N_{TA\_old}$ to $N_{TA\_new}$. Meanwhile, the terminal may previously receive a reference time delay value Di (i=1 to N, N=4 in FIG. 10) from the satellite base station at the current time point (or the current position). In an exemplary embodiment, the Di (i=1 to N) value may be transmitted from the satellite base station 410 to the terminal in an RRC parameter, a MAC CE parameter, a DCI parameter, or a combination thereof. In another exemplary embodiment, Di (i=1 to N) may be included in the ephemeris indicating the coordinates and angles of the satellite base station, and may be received from the satellite base station.

The satellite base station may express a timing advance value based on Di. That is, assuming that the terminal already knows Di, the satellite base station may express the timing advance value as a difference between Di and the actual time delay.

First, the timing advance value $T_A$ at $N_{TA}=T_A 16 \cdot 64/2^\mu$ as described above may represent the difference between Di and the actual time delay. In this case, $T_A$ may represent a positive or negative value according to Di. This is because a negative value may be expressed according to the definition of Di. That is, when the actual time delay according to the distance between the satellite base station and the terminal is T_d, $T_A$ may be expressed as (T_d-Di) or (Di-T_d). Similarly, $T_A$ may represent the difference between Di and the actual time delay also in the aforementioned $N_{TA\_new}=N_{TA\_old}+(T_A-31) \cdot 16 \cdot 64/2^\mu$.

Meanwhile, even when Di is updated (e.g., when the reference time delay is changed from D1 to D2), the terminal may recognize $N_{TA}$ or $N_{TA\_new}$ according to the previous Di (e.g., for i=1). To prevent this, the satellite base station may apply $N_{TA}$ or $N_{TA\_new}$ according to Di (e.g., for i=2) from a slot n+k+1 after a slot n in which the information about Di (i=2) is transmitted to the terminal. Up to the slot n+k, the terminal may recognize that $N_{TA}$ or $N_{TA\_new}$ according to Di (i=1) is applied. Here, k is defined as $k=[N_{slot}^{subframe,\mu} \cdot (N_{T,1}+N_{T,2}+N_{TA,max}+0.5)/T_{sf}]$ and $N_{TA,max}$ max may be expressed as Di+alpha as the maximum time delay in the cell of the satellite base station. Here, alpha may vary depending on how the reference time delay value Di of the cell and the satellite base station is set. For example, when Di is set to the maximum time delay of the cell, alpha may be zero. Parameters other than $N_{TA,max}$ are the same as the parameters used in the timing adjustment method of the 3GPP NR system described above.

(2) Timing Adjustment Method for a Plurality of Satellite Base Stations

One terminal may receive signals from multiple satellite base stations at the same time. This may be used for a handover procedure for changing a serving satellite base station by a terminal located in a cell. Multiple satellite base stations may use different frequency bands to transmit signals to the same cell at the same time. Alternatively, multiple satellite base stations may use different beams or different BWPs to transmit signals to the same cell at the same time. As such, when a plurality of satellite base stations transmit signals using different frequency bands, different beams, or different BWPs, a method for enabling the terminal to receive the signals will be described.

Figure 11:
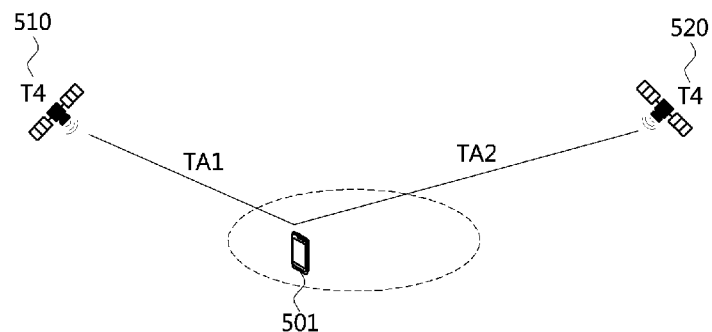
FIG. 11 is a conceptual diagram illustrating a situation of receiving signals from multiple satellite base stations to which exemplary embodiments of the present disclosure are applied.

FIG. 11 is a conceptual diagram illustrating a situation of receiving signals from multiple satellite base stations to which exemplary embodiments of the present disclosure are applied.

Referring to FIG. 11, one terminal 501 may receive signals from two satellite base stations 510 and 520 at the same time. In this case, in order for the satellite base station 510 and the satellite base station 520 to use different BWPs, information on the BWP configuration of the satellite base station 510 and the satellite base station 520 may need to be transmitted to the terminal 501.

In one exemplary embodiment, information on the configuration for the BWP for each base station (e.g., BWP1 for the satellite base station 510 and BWP2 for the satellite base station 520) in which a measurement signal (SS/PBCH block or CSI-RS) is transmitted may be transmitted to the terminal in an RRC parameter, a MAC CE parameter, a DCI parameter, or a combination thereof. In this case, the information on BWP1 and BWP2 may be received from one of the satellite base station 510 and the satellite base station 520, or may be received independently from each satellite base station. For example, the satellite base station 510 and the satellite base station 520 may exchange such BWP configuration information through an inter-satellite link (ISL), and one of the satellite base stations may provide the terminal with the BWP configuration information of the other satellite base station together with the configuration information of itself. Alternatively, the information on BWP1 may be provided to the terminal by the satellite base station 510, and the information on BWP2 may be provided to the terminal by the satellite base station 520.

In another exemplary embodiment, the above information may be transmitted as included in the ephemeris indicating coordinates and angles of the respective satellite base stations. When two satellite base stations simultaneously transmit signals in the configured BWPs, since the time delay between the terminal and each satellite base station is different, interference between the BWPs may occur at a receiving end of the terminal. To prevent this, when configuring the BWPs, a guard band between the BWPs may be configured.

Meanwhile, a serving base station (e.g., satellite base station 510) currently providing a service to the terminal 501 may receive information on the position of the terminal 501 from the terminal 501. In this case, since the serving base station (e.g., satellite base station 510) knows the position of the terminal and the other satellite base station (e.g., satellite base station 520), the serving base station may calculate a time delay TA2 according to a distance between the terminal 501 and the other satellite base station (e.g., satellite base station 520). The serving base station (e.g., the satellite base station 510) may transmit information on the BWPs of the satellite base station 510 and the satellite base station 520 and the information of TA2 to the terminal. In this case, the serving base station (e.g., satellite base station 510) may configure the information of TA2 as a difference value from the reference time delay value Di (i=4) for the serving base station (e.g., satellite base station 510) described above, and transmit the information to the terminal. The terminal may calculate a time at which the signal of the satellite base station (e.g., the satellite base station 520) arrives based on TA2 under assumption that the two satellite base stations 510 and 520 transmit the signals at the same time.

Meanwhile, the BWP for signal measurement described above may be configured in the serving base station 510 and the satellite base station 520 based on triggering of the terminal. For example, assuming a handover situation, when the serving base station 510 and the satellite base station 520 exist at specific positions (that is, when the satellite base station 520 becomes a candidate base station), the terminal may trigger the configuration of the BWPs for the above-described signal measurement.

Alternatively, the BWPs for signal measurement described above may be configured by the satellite base station 510 or 520. For example, the satellite base station 510 or 520 may configure the BWPs for the signal measurement periodically, semi-persistently, or semi-periodically.

Since the arrival time of the SS/PBCH block for BWP1 of the satellite base station 510 is different from the arrival time of the SS/PBCH block for BWP2 of the satellite base station 520, the terminal may monitor BWP2 of the satellite base station 520 during a time of (estimated arrival time of the signal of the satellite base station 520±a predetermined time range value (P_GT)). The satellite base station 520 may also maintain the configuration of BWP2 for signal measurement for a period of P_D at a periodicity of P_B. Here, P_D may be associated with P_GT, and P_B and P_D may be provided to the terminal by the satellite base station 520 as RRC parameters.

On the other hand, when the satellite base station 520 transmits CSI-RS periodically, semi-permanently, or semi-periodically for the measurement, if the transmitted CSI-RS is terminal-specific or group-specific CSI-RS rather than cell-specific CSI-RS, the satellite base station 520 may transmit the CSI-RS in accordance with a time at which the terminal (or group) receives the signal transmitted by the satellite base station 510. That is, the satellite base station 520 may transmit the CSI-RS at a time earlier or later than the transmission time of the satellite base station 510, so that the time at which the terminal (or, group) receives the CSI-RS transmitted by the satellite base station 520 is matched to the time at which the terminal (or, group) receives the CSI-RS transmitted by the satellite base station 510.

In this case, when the value of TA2 is equal to TA1, the terminal may recognize that the signal of the satellite base station 520 is the same as the signal of the satellite base station 510. Here, TA1 is $N_{TA}$ described in '(1) Timing adjustment method for a single satellite base station'. The satellite base station 520 may obtain the corresponding information from the satellite base station 510 through an inter-satellite link (ISL) to adjust its transmission time.

The above-described methods are applicable to the case of transmitting not only a signal for measurement but also a signal for data.

Beam Management Method for Satellite Base Station

Figure 12:
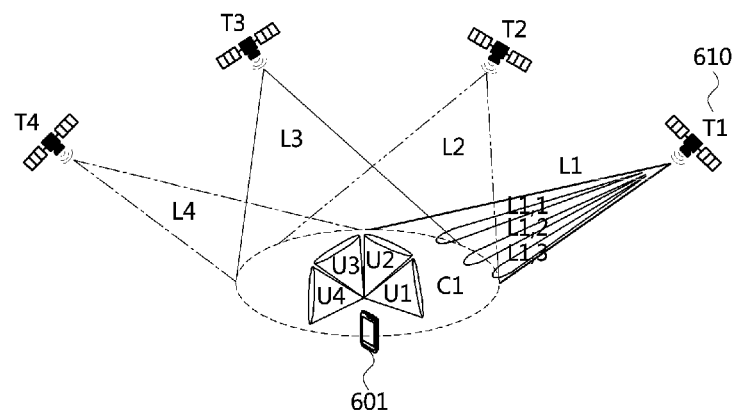
FIG. 12 is a conceptual diagram illustrating a situation in which beam configuration is changed according to movement of a satellite base station to which exemplary embodiments of the present disclosure are applied.

FIG. 12 is a conceptual diagram illustrating a situation in which beam configuration is changed according to movement of a satellite base station to which exemplary embodiments of the present disclosure are applied.

Referring to FIG. 12, it is assumed that a satellite base station 610 moves to provide a service to a terminal 601 existing in a cell C1. The satellite base station 610 may move over time (times T1 to T4), and may configure beams L1 to L4 at the time points T1 to T4. For example, the beam L1 may be configured at the time point T1, the beam L2 may be configured at the time point T2, the beam L3 may be configured at the time point T3, and the beam L4 may be configured at the time point T4.

On the other hand, the beams L1,1 to L1,3 are narrow beams that can be configured within the beam L1. In this case, L1 and L1,1 to L1,3 may be represented by a longbitmap of the ssb-PositionsInBurst parameter described with reference to FIG. 8, or may be represented in a hierarchical manner.

The beams L1 to L4, which are not the narrow beams L1,1 to L1,3, are beams divided by the time T1 to T4 according to the movement of the satellite base station to maintain the cell. On the side of the satellite base station 610, the beams L1 to L4 may be the same single beam, and L (i.e., the number of beams) may be set to 1. That is, the satellite base station 610 and the terminal 601 may not distinguish the beams L1 to L4. However, it may be advantageous to distinguish the beams to provide continuous service even when the serving base station changes (e.g., handover situation). To this end, similarly to the beam sweeping scheme of the terrestrial base station (gNB) of the general NR system, the indices of the beams L1 to L4 over time T1 to T4 may be mapped to the indices of the SS/PBCH blocks, so that the beams L1 to L4 according to time T1 to T4 can be distinguished.

In this case, the SS/PBCH block transmitted per time may be distinguished using the ssb-PositionInBurst parameter. For example, as shown in FIG. 10, when beams are distinguished according to four times T1 to T4, the shortBitmap of the ssb-PositionInBurst parameter may be configured with L1={1,0,0,0} to L4={0, 0, 0, 1}.

Alternatively, the beams may be distinguished only in two or three cases. As an example, two cases (e.g., cell start time and remaining time) may be configured with L1={1,0,0,0} and {L2, L3, L4}={0,1,0,0}. As another example, three cases (e.g., service start time, cell last service time, and remaining time) may be configured with where L1={1,0,0, 4}, {L2, L3}={0,1,0,0}, and L4={0,0,1,0}.

Meanwhile, in the handover situation, the serving base station may transmit QCL information of the candidate (neighbor) base station to the terminal using the above information.

Figure 13:
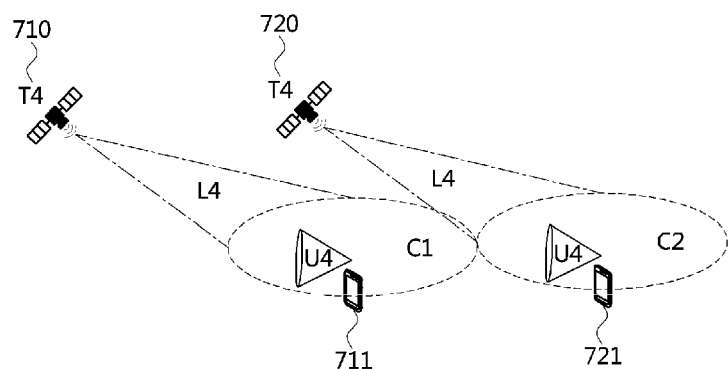
FIG. 13 is a conceptual diagram illustrating a situation in which handover occurs between satellite base stations to which exemplary embodiments of the present disclosure are applied.

FIG. 13 is a conceptual diagram illustrating a situation in which handover occurs between satellite base stations to which exemplary embodiments of the present disclosure are applied.

For example, as shown in FIG. 13, when a beam L1 for a satellite base station 710 is mapped to an SS/PBCH block index 1, information on a beam L4 of a satellite base station 720 may be transmitted through a TCI by the by the satellite base station 710 to a terminal 711 as an SS/PBCH block index 4 obtained through the satellite base station 710. In this case, the premise that the same QCL can be applied between different satellite base stations is utilized. TCIs can be configured according to the QCL between the satellites or between the satellite base stations, and the TCIs of the satellite base station 710 may be applied to transmission channels of the satellite base station 720 in order to establish the QCL relationship between one satellite (e.g., the satellite base station 710) and the other satellite (e.g., the satellite base station 720). When four beam patterns are mapped to SSB indexes 1 to 4, it may be assumed that the patterns of the beams of the satellite base station 710 and the patterns of the beams of the satellite base station 720 are the same (or similar). This is because the satellite base stations move along the same route. Therefore, when the terminal 711 needs to know the beam pattern of the satellite base station 720, since the corresponding beam pattern is already measured by the terminal 710 using the SSB index 4 of the satellite base station 710, the satellite base station 710 may inform the terminal 711 that the corresponding beam pattern is the beam pattern of the SSB index 4 without having to measure the corresponding beam pattern of the base station 720. Such information may be included in the satellite base station 720 and the TCI ID (TCI of the satellite base station 710) in a RadioLinkMonitoringConfig or a HandoverCommand message.

In another exemplary embodiment, NZP-CSI-RS-ResourceId may be used instead of the index of the SS/PBCH block. That is, instead of measuring the beam pattern using the SS/PBCH block and mapping it to the index of the SS/PBCH block, the NZP-CSI-RS may be measured, and the beam pattern may be mapped to the NZP-CSI-RS-Resource ID in the same manner. This may be used for setting the initial values when receiving a signal from the satellite base station 520 described above with reference to FIG. 11 or receiving a service from the satellite base station 520. To this end, the QCL-Info may include a cell and bwp-Id as well as a unique identifier (ID) of the satellite base station. For example, a satellite catalog number of the above-described TLE data format may be used as the unique identifier of the satellite base station.

In addition, the SS/PBCH block or the CSI-RS serving as a reference RS should be included in a target RS other than the reference RS. When the reference RS is the SS/PBCH block or CSI-RS, QCL for this may be transmitted in an RRC parameter, a MAC CE parameter, a DCI parameter, or a combination thereof. When the QCL is represented by the SS/PBCH block index, each of the QCLs may be expressed using a longbitmap of the ssb-PositionsInBurst parameter, or may be expressed in a hierarchical manner. When the QCL is represented in a hierarchical manner, only inOneGroup may be used for the QCL. For some beams (e.g. L1 to L4 or inOneGroup), TCI may be configured in a cell-specific manner rather than in a terminal-specific manner, and the QCL may be assumed.

The terminal may distinguish the beams by the SS/PBCH block indexes and inform the QCL through a Transmission Configuration Index (TCI). As described with reference to FIGS. 10 and 11, Di, SS/PBCH block, and BWP configuration information depend on the position of the satellite base station, and this information may be included in the ephemeris. The QCL information may be equally applied to uplink as well as downlink by using spatial relation info information for transmission of the terminal.

Meanwhile, a parameter Mv_I indicating whether the satellite base station is a satellite base station forming a beam having motion over earth or a satellite base station forming a earth fixed beam may be transmitted as an RRC parameter, MAC CE parameter, DCI parameter, or a combination thereof. This parameter may be included in the ephemeris representing the coordinates and angles of the satellite. Through this, the terminal may identify a procedure to be performed by the terminal.

For example, when the terminal identifies that the base station is a satellite base station forming a beam moving on the ground through the parameter Mv_I (or when there is no Mv_I parameter), if there is no TCI information, the terminal may use a beam of the most recently measured SS/PBCH block instead of using a beam corresponding to the initial access. In case of uplink, the terminal may use a beam having a spatial relation with the most recently measured SS/PBCH block.

Meanwhile, when the terminal identifies that the base station is a satellite base station forming a beam fixed to the ground through the parameter Mv_I, the terminal may use a beam corresponding to the initial access.

Apparatuses According to the Exemplary Embodiments

Figure 14:
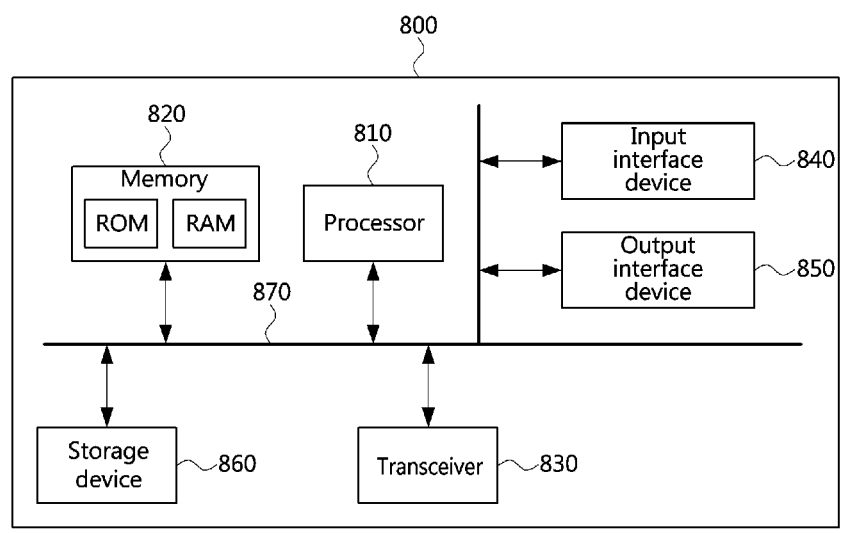
FIG. 14 is a block diagram illustrating a configuration of an apparatus for performing a timing adjustment method and a beam management method according to exemplary embodiments of the present disclosure.

FIG. 14 is a block diagram illustrating a configuration of an apparatus for performing a timing adjustment method and a beam management method according to exemplary embodiments of the present disclosure.

The apparatus illustrated in FIG. 14 may be a communication node (terminal or base station) for performing the methods according to the exemplary embodiments of the present disclosure.

Referring to FIG. 14, a communication node 800 may include at least one processor 810, a memory 820, and a transceiver 830 connected to a network to perform communication. In addition, the communication node 800 may further include an input interface device 840, an output interface device 850, a storage device 860, and the like. The components included in the communication node 800 may be connected by a bus 870 to communicate with each other. However, each component included in the communication node 800 may be connected to the processor 810 through a separate interface or a separate bus instead of the common bus 870. For example, the processor 810 may be connected to at least one of the memory 820, the transceiver 830, the input interface device 840, the output interface device 850, and the storage device 860 through a dedicated interface.

The processor 810 may execute at least one instruction stored in at least one of the memory 820 and the storage device 860. The processor 810 may refer to a central processing unit (CPU), a graphics processing unit (GPU), or a dedicated processor on which the methods according to the exemplary embodiments of the present invention are performed. Each of the memory 820 and the storage device 860 may be configured as at least one of a volatile storage medium and a nonvolatile storage medium. For example, the memory 820 may be configured with at least one of a read only memory (ROM) and a random access memory (RAM).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A timing adjustment method with a satellite base station, performed by a terminal, the timing adjustment method comprising:

receiving a reference time delay value from the satellite base station;
receiving a timing advance command from the satellite base station; and
calculating an actual time delay value between the terminal and the satellite base station by using the reference time delay value and a value included in the timing advance command, and updating a timing advance value of the terminal for the satellite base station by using the calculated actual time delay value,
wherein the value included in the timing advance command for initial access, timing advance maintenance, handover, or beam switching has a positive or negative value depending on the reference time delay value, and
wherein the reference time delay value is received from the satellite base station through at least one of a physical downlink control channel (PDCCH), a radio resource control (RRC) signaling, and a medium access control (MAC) control element (CE), or received from the satellite base station as included in ephemeris of the satellite base station.

2. The timing adjustment method according to claim 1, wherein the reference time delay value is a representative time delay value between the satellite base station and the terminal, which corresponds to a specific time point, a specific time interval, or a specific position of the satellite base station.

3. The timing adjustment method according to claim 1, wherein when a new time delay value replacing the reference time delay value is received in a slot n, the terminal uses the new time delay value from a beginning of a slot (n+k+1) for calculating the actual time delay value between the terminal and the satellite base station, wherein each of n and k is an integer equal to or greater than 0.

4. The timing adjustment method according to claim 3, wherein k is defined as $k=[N_{slot}^{subframe,\mu} \cdot (N_{T,1}+N_{T,2}+N_{TA,max}+0.5)/T_{sf}]$, $N_{T,1}$ is a time length of $N_1$ symbols corresponding to a physical downlink shared channel (PDSCH) reception time for processing capability of the terminal when an additional PDSCH demodulation reference signal (DM-RS) is configured, $N_{T,2}$ is a time length of $N_2$ symbols corresponding to a physical uplink shared channel (PUSCH) preparation time for processing capability of the terminal, $N_{TA,max}$ is a maximum time delay within a cell of the satellite base station, $N_{slot}^{subframe,\mu}$ is a number of slots per subframe, and $T_{sf}$ is a time length of a subframe of 1 msec.

5. The timing adjustment method according to claim 2, wherein the reference time delay value is set to a maximum time delay between the satellite base station and the terminal, a minimum time delay between the satellite base station and the terminal, or a time delay between a center of a cell and the satellite base station.

6. A method for receiving signals from a first satellite base station and a second satellite base station, performed by a terminal, the method comprising:
obtaining information on a first bandwidth part (BWP) of the first satellite base station that is a serving base station, and information on a second BWP of the second satellite base station;
providing information on a current position of the terminal to the first satellite base station;
obtaining an estimated time delay value between the terminal and the second satellite base station from the first satellite base station; and
estimating a time point at which a signal of the second satellite base station arrives at the terminal based on the estimated time delay value, and monitoring the second BWP for a period within a predetermined time range from the estimated time point,
wherein the first satellite base station and the second satellite base station transmit signals at a same time.

7. The method according to claim 6, wherein the information on the first BWP and the information on the second BWP are received from one of the first satellite base station and the second satellite base station through at least one of a physical downlink control channel (PDCCH), a medium access control (MAC) control element (CE), and a radio resource control (RRC) signaling, or received respectively from the first satellite base station and the second satellite base station through at least one of a PDCCH, a MAC CE, and an RRC signaling.

8. The method according to claim 6, wherein the information on the first BWP is received from the first satellite base station as included in ephemeris of the first satellite base station, and the information on the second BWP is received from the second satellite base station as included in ephemeris of the second satellite base station.

9. The method according to claim 6, wherein a guard band is configured between the first BWP and the second BWP.

10. The method according to claim 6, wherein each of the first BWP and the second BWP is configured periodically, semi-persistently, or semi-periodically.

11. The method according to claim 6, wherein the obtaining of the estimated time delay value further comprises:
receiving a difference value between a reference time delay value of the first satellite base station and the estimated time delay value from the first satellite base station; and
calculating the estimated time delay value using the difference value and the reference time delay value.

12. The method according to claim 11, wherein the reference time delay value is a representative time delay value between the first satellite base station and the terminal, which corresponds to a specific time point, a specific time interval, or a specific position of the first satellite base station.

13. A timing adjustment method with a satellite base station, performed by a terminal, the timing adjustment method comprising:
receiving, from the satellite base station, information related to a position of the satellite base station or a delay time (v) between the satellite base station and the terminal;
when receiving the information related to the position of the satellite base station from the satellite base station, calculating the delay time (v) based on a position of the terminal and the position of the satellite base station; and
transmitting a physical random access channel (PRACH) at a time (t−v) earlier by the delay time v than a configured transmission time t of the PRACH.

14. The timing adjustment method according to claim 13, further comprising, when an initial access by the transmission of the PRACH fails, re-transmitting the PRACH at a time $(t-v-t_{offset})$ or $(t-v+t_{offset})$ by applying a time offset $t_{offset}$.

* * * * *